United States Patent [19]
Licht

[11] Patent Number: 6,033,343
[45] Date of Patent: Mar. 7, 2000

[54] IRON-BASED STORAGE BATTERY

[75] Inventor: Stuart Licht, Haifa, Israel

[73] Assignee: Chemergy Ltd., Haifa, Israel

[21] Appl. No.: 09/072,448

[22] Filed: May 5, 1998

[30] Foreign Application Priority Data

May 5, 1997 [IL] Israel ........................................ 120784

[51] Int. Cl.$^7$ ...................................................... H01M 4/02
[52] U.S. Cl. .......................... 479/221; 429/209; 429/218.1
[58] Field of Search .................................... 429/221, 223, 429/218.1

[56] References Cited

U.S. PATENT DOCUMENTS 4,675,256  6/1987  Winchester et al. .
4,795,685  1/1989  Bones et al. .
5,429,894  7/1995  Leap et al. .

OTHER PUBLICATIONS

Goff, H. et al., "Studies on the Mechanism of Isotopic Oxygen Exchange and Reduction of Ferrate (VI) Ion $(FeO_4{}^{2-})^1$," J. Amer. Chem. Soc., 93:23, Nov. 17, 1971, pp. 6058–6065.

Gump, J. et al., "Preparation and Analysis of Barium Ferrate (VI)," Anal. Chem., 26, 1954, p. 1957.

Thompson, G. et al., "Preparation and Purification of Potassium Ferrate. VI," J. Amer. Chem. Soc. 73, Mar. 1951, pp. 1379–1381.

Schreyer, J. et al., "Stability of the Ferrate (VI) Ion in Aqueous Solution," Anal. Chem. 23, 1951, pp. 1312–1314.

Primary Examiner—Maria Nuzzolillo
Assistant Examiner—Mark Ruthkosky
Attorney, Agent, or Firm—Browdy and Neimark

[57] ABSTRACT

An electric storage battery having a solid phase Fe(VI) salt cathode. The anode may be any of a large variety of conventional anode materials capable of being oxidized. The cathode and anode are located in separate half-cells which are in electrochemcial contact trough an electrically neutral ionic conductor. Optionally means may be provided for impeding the transfer of chemically reactive species between the two half-cells. Also optionally gas separator means may be provided for preventing the build-up of oxygen, hydrogen and other gases.

36 Claims, 4 Drawing Sheets

IRON-BASED STORAGE BATTERY

The present invention relates to electric storage batteries. More particularly, the invention relates to a novel electric storage battery with an iron salt as cathode.

BACKGROUND OF THE INVENTION

There is an ongoing need for providing novel improved electrical storage batteries, which are low-cost have a high-energy density and are environmentally acceptable. Among the main types of storage batteries are those in which the cathodes (the positive electrodes) are based on any of $PbO_2$, HgO, $MnO_2$ and NiOOH which are known to possess a theoretical capacity in the range of between 224 to 308 Ah/g. However, these cathode materials are considered as hazardous or environmentally unfriendly.

In a very recent U.S. Pat. No. 5,429,894, iron-silver (iron in its zero valence state) was suggested as a battery anode (negative). Iron salts in the +2 and +3 valence state, were also suggested as a battery cathode in the past as described, for example, in U.S. Pat. No. 4,675,256 and U.S. Pat. No. 4,795,685.

Prima facie, salts containing iron in the +6 valence state, hereafter called Fe(VI), which are capable of multiple electron reduction, would be capable to provide a higher cathode storage capacity. However, decomposition with reduction of the iron to a less oxidized form (i.e. to a lower valence state) occurs very rapidly, the stability of Fe(VI) salt solutions being only the order of a few hours at room temperature (Anal. Chem. 23, 1312–4, 1951). The Fe(VI) salts may be made by chemical oxidation, such as reported by G. Thompson (J. Amer. Chem, Soc. 73, 1379, 1951), or by precipitation from another Fe(VI) salt, such as reported by J. Gump et al. (Anal. Chem. 26, 1957, 1954). However, as mentioned in a later report by H. Goff et al (J. Amer. Chem, Soc. 93, 6058–6065, 1971), only little is known on the chemistry of Fe(VI) salts. The decomposition of an Fe(VI) salt to a salt in which the iron has a lower valence, results in a spontaneous loss of the electrochemical storage capacity. For example, the anion $FeO_4^{-2}$ such as in $K_2FeO_4$, is unstable in neutral aqueous solutions and decomposes at a rate $k_f$ according to the following equation:

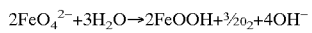

The resultant product in this decomposition: Fe(III)OOH, is environmentally more friendly than any of $PbO_2$, HgO, $MnO_2$ and NiOOH, but has a lower electrochemical storage capacity.

It is an object of the present invention to provide a novel type of battery which is inexpensive, highly stable, possesses a high storage capacity, a high voltage and is environmentally friendly.

BRIEF DESCRIPTION OF THE INVENTION

The invention relates to an electrical storage cell, so-called battery, comprising two half-cells which are in electrochemical contact with one another through an electrically neutral ionic conductor, wherein one of said half-cells comprises an anode and the other half-cell comprises a cathode in form of a solid-phase Fe(VI) salt in an amount of at least 1% of the half-cell weight, whereby electrical storage is accomplished via electrochemical reduction to a valence of iron salt less than Fe(VI). The high +6 valence state of the iron in said salt provides the advantage of a high storage capacity and high voltage, and iron salts provide an environmental advantage over more toxic materials used for electrochemical electric storage.

BRIEF DESCRIPTION OF THE FIGURES

FIGS. 2 to 5 illustrate graphically aspects of the performance of various batteries according to the invention as described in the Examples.

DETAILED DESCRIPTION OF THE INVENTION

Figure 1:
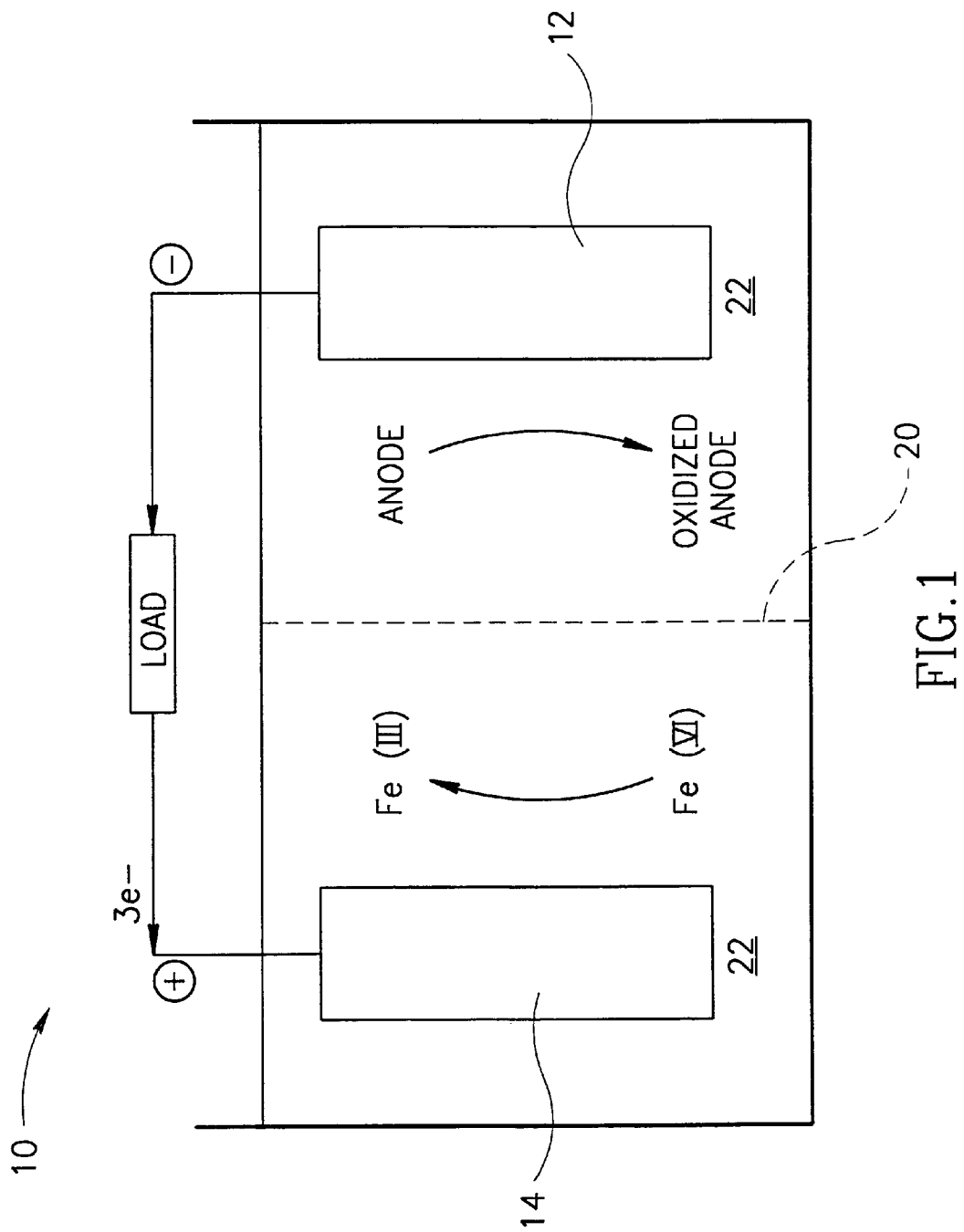
FIG. 1 is a diagrammatic illustration of an Fe(VI) battery according to the invention.

The novel battery according to the present invention is based on an Fe(VI) (hereafter occasionally referred to as "super iron") half cell serving as cathode, in contact with an anode half cell through an electrically neutral ionic conductor. The discharge in this battery is based on the reduction of the Fe(VI) salt to the +3 valence state. The Fe(VI) salt, e.g. $M_2FeO_4$ where M is an alkali cation or ammonium, may be prepared by oxidation of iron. Several chemical oxidation methods have been suggested, but among methods which yield Fe(VI) salts of highest purity is the one reported by G. Thompson (J. Amer. Chem. Soc, 73, 1379, 1951), By this method, Fe(VI) salts are obtained through the reaction of a solution of hydroxide and hypochlorite (such as NaOH and NaOCl with an Fe(III) salt, such as $Fe(NO_3)_3$, as illustrated below:

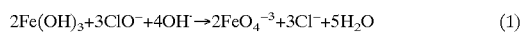

and the resulting Fe(VI) salt (such as $K_2FeO_4$) is recovered by precipitation from a less soluble solution (such as concentrated KOH), and is then cleaned and dried.

Further typical examples of Fe(VI) salts are $M_x(FeO_4)_y$ where x and y are integers and M is a cation from the group of alkali earth metal cations, transition metal cations and cations of elements of groups III, IV and V of the periodic table, Examples thereof include, but are not limited to $K_2FeO_4$, $Na_2FeO_4$, $Li_2FeO_4$, $Cs_2FeO_4$, $Rb_2FeO_4$, $H_2FeO_4$, $(NH_4)_2FeO_4$, $(N(C_4H_9)_4)_2FeO_4$, $BeFeO_4$, $MgFeO_4$, $CaFeO_4$, $SrFeO_4$, $BaFeO_4$, $Hg_2FeO_4$, $HgFeO_4$, $Cu_2FeO_4$, $CuFeO_4$, $ZnFeO_4$, $Ag_2FeO_4$, $AsFeO_4$, $FeO_3$, $FeFeO_4$, $Fe_2(FeO_4)_3$, $CrFeO_4$, $MnFeO_4$, $NiFeO_4$, $CoFeO_4$, $Al_2(FeO_4)_3$, $In_2(FeO_4)_3$, $Ga_2(FeO_4)_3$, $SnFeO_4$, $PbFeO_4$, $Sn(FeO_4)_2$, $Pb(FeO_4)_2$.

Several Fe(VI) syntheses methods which include precipitation from another Fe(VI) salt have been suggested, but the method which yields among the highest purity Fe(VI) salts is the method reported by J. Gump et al. (Anal. Chem. 26, 1957, 1954). By this method, Fe(VI) salts may be obtained through the reaction of an existing Fe(VI) salt (such as $K_2FeO_4$) with a soluble salt (such $BaCl_2$ or $BaNO_3$) to precipitate another Fe(VI) salt (such as $BaFeO_4$).

Without being bound to any theory, based on the three-electron reduction of these materials as expressed in the equation:

the electrical storage capacity is high as represented for a few of the materials in Table 1.

TABLE 1

Cathode storage capacity of several Fe(VI) salts

| Fe(VI) salt | Formula Wt. G/mole | Charge capacity |
|---|---|---|
| $Li_2FeO_4$ | 133.8 | 601 Amp hour/kg |
| $Na_2FeO_4$ | 165.9 | 485 Amp hour/kg |
| $K_2FeO_4$ | 198.0 | 406 Amp hour/kg |
| $Cs_2FeO_4$ | 385.6 | 206 Amp hour/kg |
| $Ag_2FeO_4$ | 335.6 | 236 Amp hour/kg |
| $MgFeO_4$ | 144.1 | 558 Amp hour/kg |
| $CaFeO_4$ | 159.9 | 505 Amp hour/kg |
| $SrFeO_4$ | 207.5 | 387 Amp hour/kg |
| $BaFeO_4$ | 257.2 | 313 Amp hour/kg |

The Fe(VI) salt whose preparation is exemplified by, but not limited to either chemical oxidation of Fe(III) or precipitation from another Fe(VI) salt is placed in contact with a conductive material, such as graphite, carbon black or a metal. These and other agents can be formed by mixing with Fe(VI) as a powder, and the powder can be pressed with these and other agents to improve mechanical strength. Rather than mixing with a conductive material, the Fe(VI) salt can be placed in direct contact with a conductive material. These conductive materials include but are not limited to a planar conductive surface, a wire, a porous conductive substrate or a conductive grid.

The anode of the battery may be selected from the known list of metals capable of being oxidized, typical examples being zinc, lithium; common battery anodes such as cadmium, lead and iron; high capacity metals such: aluminum, magnesium, calcium; and other metals such as copper, cobalt, nickel, chromium, gallium, titanium, indium, manganese, silver, cadmium, barium, tungsten, molybdenum, sodium, potassium, rubidium and cesium.

The anode may also be of other typical constituents capable of being oxidized, examples include, but are not limited to hydrogen, (including but not limited to metal hydrides), inorganic salts, and organic compounds including aromatic and non-aromatic compounds.

The electrically neutral ionic conductor utilized in the battery according to the present invention, comprises a medium that can support current density during battery discharge. A typical representative ionic conductor is an aqueous solution preferably containing a high concentration of a hydroxide such as KOH. In other typical embodiments, the electrically neutral ionic conductor comprises common ionic conductor materials used in batteries which include, but are not limited to an aqueous solution, a non-aqueous solution, a conductive polymer, a solid ionic conductor and a molten salt.

In a preferred embodiment of the invention, the cell includes gas separator means such as vent or a void space for preventing the build-up in the cell of oxygen, hydrogen and other gases.

According to another embodiment of the invention, means are provided to impede transfer of chemically reactive species, or prevent electric contract between the anode and Fe(VI) salt cathode. Said means includes; but is not limited to a membrane, a ceramic frit, a non-conductive separator configured with open channels, grids or pores or agar solution; such means being so positioned as to separate said half cells from each other.

An electric storage battery according to the invention may be rechargeable by application of a voltage in excess of the voltage as measured without resistive load, of the discharged or partially discharged cell.

DETAILED DESCRIPTION OF FIG. 1

FIG. 1 illustrates schematically an electrochemical cell 10 based on an Fe(VI) half cell, an electrically neutral ionic conductor and an anode. The cell contains an electrically neutral ionic conductor 22, such as a concentrated aqueous solution of KOH, in contact with an Fe(VI) cathode 14 n form of a pressed pellet containing graphite powder and solid $K_2FeO_4$. Reduction of Fe(VI) ions such as in the form of $FeO_4^{2-}$ anions, is achieved via electrons available from the electrode 14. The anode electrode 12, such as in the form of metal is also in contact with the electrically neutral ionic conductor 22. Electrons are released in the oxidation of the anode. Optionally, the cell may contain an ion selective membrane 20 as a separator, for minimizing the non-electrochemical interaction between the cathode and the anode.

The invention will be hereafter illustrated by the following Examples, it being understood that the Examples are presented only for a better understanding of the invention without implying any limitation thereof.

EXAMPLE 1

An experiment was carried out with the object of increasing the half-life of the Fe(VI) chemical species beyond 100 hours, in order to be available for electrochemical reduction.

The decomposition rate was characterized using visible absorption spectrum of $FeO_4^{2-}$ in highly alkaline aqueous solution, which exhibits a sharp maximum at 505 nm, an absorption shoulder at 570 nm and two minima at 390 nm and 675 nm. The measured molar absorptivity at 505 nm was 1040 $molar^{-1}$ $cm^{-1}$ and remained constant up to 200 millimolar solutions of $K_2FeO4$. The 505 nm absorbance of 2 millimolar $K_2FeO_4$ was substantially the same in a solution of lithium hydroxide, or up to 15 molar salts of sodium hydroxide or potassium hydroxide.

The electrolytes which were studied for the decomposition rate of $FeO_4^{2-}$ contained various concentrations up to saturation of LiOH, NaOH, KOH and CsOH at 4° C., 22° C. and 40° C. The rate of decomposition of $FeO4^{2-}$ was measured to be directly proportional in first order to the $FeO_4^{2-}$ concentration according to the equation:

$$d[FeO^{2-}]/dt-k_f[FeO_4^{2-}] \tag{3}$$

which yields the half life ($t_{1/2}$) for 50% of the $FeO_4^{2-}$ to decompose, thus resulting:

$$t_{1/2}=0.693/k_f \tag{4}$$

For this reason, at 22° C. in a solution of 5 molar LiOH, $FeO_4^{2-}$ is consumed 50 times faster in a 100 millimolar compared to a solution of 2 millimolar $FeO_4^{2-}$ and both solutions have a 34 hours half life expressed as follows:

$$k_f=5.7\times10^{-6} \, s^{-1} \tag{5}$$

The stability of Fe(VI) in other solutions is shown in Table 2.

TABLE 2

Fe(VI) solubility, S in mM decomposition rate $k_f$, and stability time for 0.01 liter (10 ml) of a molar (M) solution in contact with 0.05 kg (50 g) $M_2FeO_4$ as predicted by equation (5)

| Solution | Temp | S.mM | $K_f, s^{-1}$ | Fw* ($M_2FeO_4$) | Stability (days) |
|---|---|---|---|---|---|
| 5 M LiOH | 22° C. | 940 | $5.7 \times 10^{-6}$ | 133.8 | 90 |
| 5 M NaOH | 22° C. | 1410 | $1.8 \times 10^{-5}$ | 165.9 | .4 |
| 5 M KOH | 22° C. | 72 | $2.4 \times 10^{-5}$ | 198.1 | .70 |

TABLE 2-continued

Fe(VI) solubility, S in mM decomposition rate $k_f$, and stability time for 0.01 liter (10 ml) of a molar (M) solution in contact with 0.05 kg (50 g) $M_2FeO_4$ as predicted by equation (5)

| Solution | Temp | S.mM | $K_f$, $s^{-1}$ | Fw* ($M_2FeO_4$) | Stability (days) |
|---|---|---|---|---|---|
| 5 M $C_5OH$ | 22° C. | 33.7 | $1.1 \times 10^{-3}$ | 385.6 | 4 |
| 10 M NaOH | 22° C. | 490 | $1.2 \times 10^{-5}$ | 165.9 | 55 |
| 10 M KOH | 22° C. | 19 | $6.2 \times 10^{-6}$ | 198.1 | 240 |
| 10 M CsOH | 22° C. | 9.2 | $6.3 \times 10^{-4}$ | 385.6 | 26 |
| 10 M KOH | 40° C. | 37.5 | $2.1 \times 10^{-5}$ | 198.1 | 370 |
| 10 M KOH | 4° C. | 8 | $2.1 \times 10^{-6}$ | 198.1 | 17,400 |
| 15 M NaOH | 22° C. | 146 | $5 \times 10^{-6}$ | 165.9 | 480 |
| 13 M KOH | 22° C. | 2.9 | $4.6 \times 10^{-6}$ | 198.1 | 21,900 |
| Satd. KOH | 22° C. | 1.7 | $2.1 \times 10^{-7}$ | 198.1 | 320,000 |

*Fw - Formula Weight

As can be noticed, in 5 M LioH, NaOH, KOH or CsOH the decomposition rate increases upon moving down the column of alkali hydroxides, at 22° C. is equal to $t_{1/2}$ being only 10 minutes in the 5 M CsOH solution. However, at higher hydroxide concentrations. $FeO_4^{2-}$ is more stable in KOH than in NaOH; thus solutions of 10 M NaOH and KOH electrolytes have $t_{1/2}$ of 16 and 31 hours respectively, and 15 M NaOH and 13 M KOH have $t_{1/2}$ of 38 and 42 hours respectively. It was found that the reaction rate $k_f$ are three fold higher at 40° C. and three fold lower at 4° C. At 22° C. a saturated solution of KOH (about 14 molar), the rate of decomposition is lower, $k_f$ being; $2.1 \times 10^{-7}$ $s^{-1}$ with a solution having a half life of 920 hours, more than a hundred fold improvement over the stability in a solution of 5 molar KOH.

The absolute rate of $FeO_4^{2-}$ decomposition is further minimized by several orders of magnitude by determining and utilizing electrolytes which limit its solubility to decrease $d[FeO_4^{2-}]/dt$. To this end, as summarized in Table 2, for NaOH and KOH electrolytes, the solublities of Fe(VI) were measured. At 22° C., in a solution of 5 molar NaOH the solubility of $FeO_4^{2-}$ is over 1.4 moles, while in a saturated solution of KOH it is only 0.0017 molar $FeO_4^{2-}$. Except for a concentrated (nearly saturated) solution of 5 molar LiOH solution at 22° C., with a millimolar solubility (S) of $FeO_4^{2-}$, S=940, generally the solubility(s) diminished with an increase of the alkali cation mass. Thus, for a solution of 5 molar NaOH, KOH and CsOH, S was 1410, 72 and 33.7 respectively. In a similar manner, for a solution of KOH of 10 molar, 13 molar, and a saturated one, S was 19, 2.9 and 1.7 respectively.

Figure 2:
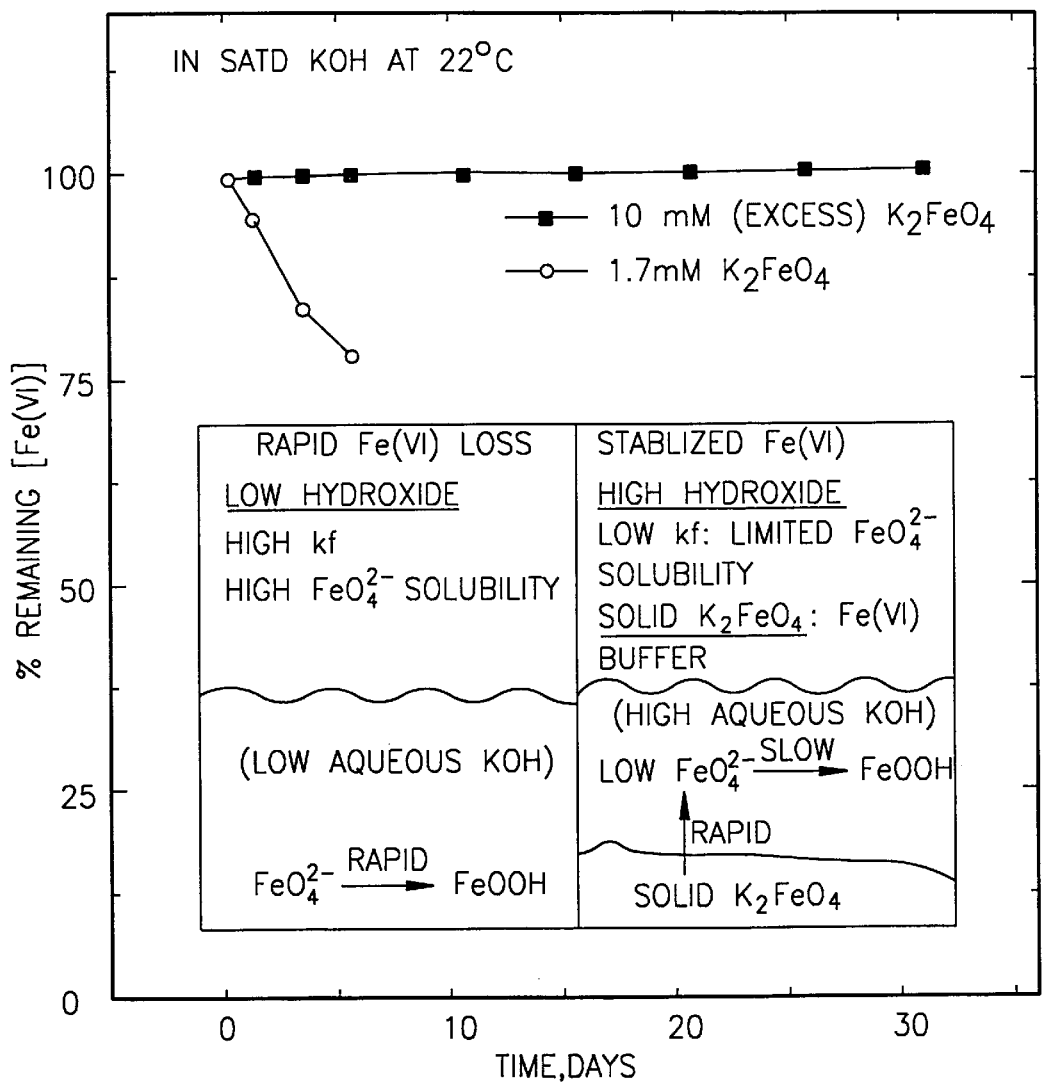

Solubility diminished with a decrease in the temperature and at 60° C., 40° C. and 4° C. for a saturated KOH solution, S=4.3, 2.9 and 1.2 respectively. These effects of high alkali cation mass, low temperature and high hydroxide concentration appear to be cumulative, and at 4° C. in a solution of 15 moles CsOH. the $FeO_4^{2-}$ is highly insoluble. A farther improvement in the $FeO_4^{2-}$ stability is achieved by utilizing an excess of solid Fe(VI) in contact with a low solubility of Fe(VI) solution. Extended results over several weeks on the solution decomposition are shown in FIG. 2. Thus, in a saturated solution of KOH containing an excess of solid KOH, a solution with an initial concentration of 1.7 millimolar of $K_2FeO_4$ lost only 0.3 millimolar of active Fe(VI) in 100 hours. In a second experiment a six fold excess, of the $K_2FeO_4$, beyond the saturation point was added to a saturated solution of KOH. As shown in FIG. 2, after one month the solution contains a constant concentration of dissolved $FeO_4^{2-}$. These results provide a pathway to prepare stable concentrations of Fe(VI). This is represented schematically in the inset of FIG. 2. The electrolyte is based on a concentrated hydroxide solution, containing a cation which inhibits decomposition, such is $K^-$. The solution is saturated not only with $K_2FeO_4$, but also contains an excess of solid $K_2FeO_4$. The generalized system utilizes mass (m) of Fe(VI) salt with formula weight (FW) in contact with a volume of a solution (V). The dissolution of said mass, provides a constant saturated concentration (S) of Fe(VI). The required stable time (tstable) which is necessary for Fe(VI) concentration to be below S is represented by the formula:

$$tstable = m \, FW^{-1} \, V^{-2} \, k_f^{-1} \, s^{-1} \quad (5)$$

Using the measured values of S and $k_f$, Table 2 presents the predicted life-time of a system containing 0.05 kg (50 g) of $M_2FeO_4$ in contact with 0.01 liter (10 ml) of the respective alkali hydroxide. A saturated KOH is an attractive electrolyte, minimizing both the solubility and the rate of loss of $K_2FeO_4$. When decomposition occurs, the excess of solid $K_2Fe(\ )_4$ dissolves providing a constant buffer source to maintain a corresponding saturated solution with a predicted life-time of the $K_2FeO_4$ of over 1,000 years.

Release of the cathode materials into the environment would result in a dilution of the hydroxide, which will enhance the $FeO_4^{2-}$ dissolution and a rapid degradation to an innocuous FeOOH according to equation (1).

EXAMPLE 2

An experiment was carried out in order to determine the capability of achieving a high voltage and the theoretical three electron reduction capability in discharge of Fe(VI) salts in solutions as expressed in the equation. This was examined by a galvanostatic reduction of dissolved Fe(VI) in a 13.5 molar solution of potassium hydroxide.

Figure 3:
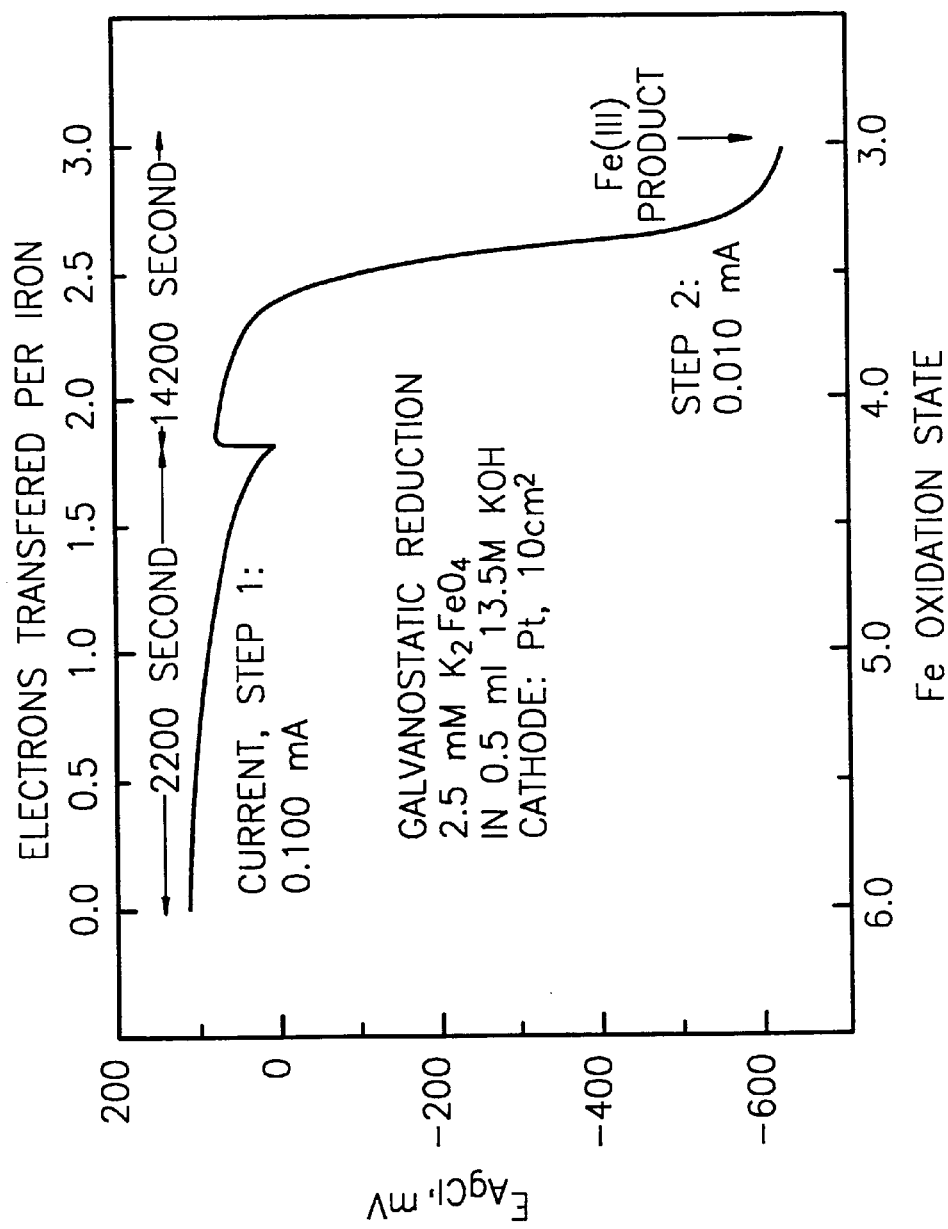

FIG. 3, shows the time evolution of the potential, during Fe(VI) reduction. In an initial concentration cinitial=2.5 millimolar of $K_2FeO_4$, in volume V=0.5 ml of a solution of 13.5 molar KOH was reduced at a current density J=0.100 mA/cm$^2$, and a subsequent continued reductior at J=0.010 mA/cm$^2$, on a Pt electrode with a surface area, A=10 cm$^2$. Integration of the charge transferred, q=tJ A/F (F being the Faraday constant and t being time) yields the relative oxidation state=q/(Vcinitial) compared to the charge of the Fe(III) product. As shown in FIG. 3, the solid curve 1 illustrates the oxidation state of the starting material which approaches Fe(VI) according to the equation and yields the +6 valence state of iron, After completion of the three electron transfer, the negative shift in the potential as illustrated in FIG. 3 is consistent with the depletion of the initial Fe(VI) and subsequent hydrogen evolution. A cathode half cell with a more positive redox couple will result in a higher voltage battery, and the Fe(VI) half cell has a high positive redox potential, Terminating the discharge in FIG. 3 after 1, of the 3 electrons per Iron, has been transferred forms a solution containing on the average Fe(V), for example as in the form of $FeO_4^-$. Stopping the discharge in FIG. 3 after 2, of the 3 electrons per Iron, has been transferred forms a solution containing on the average Fe(IV), for example as in the form of $FeO_3^{2-}$. Respectively, in these latter two cases, recommencing the reduction results in discharging a Fe(V) or a Fe(VI) battery.

The measured redox potentials at a platinum electrode, of 2 milimolar, 20 milimolar, 60 milimolar and 100 millimolar of $K_2FeO_4$ in various solutions of sodium hydroxide show that they are positive, increase with Fe(VI) concentration and decrease with the hydroxide concentration.

Generally, this redox potential varied from E(15 molar NaOH, 2 milimolar $K_2FeO_4$)=0.5 V to E(5 molar NaOH, 100 milimolar $K_2FeO_4$)=0.7 V, measured in volts versus the standard hydrogen electrode, and were similar values in solutions of KOH.

EXAMPLE 3

As summarized in Table 3, the observed steady state current densities at 22° are low, less than 100 $\mu A/cm^2$ for reduction of 2 mM millimolar $FeO_4^{2-}$). This may be improved six fold by use of a high surface area porous Ni substrate, although the resultant current density of 0.4 $mA/cm^2$ remains too low for many battery applications. These current densities are dramatically improved through formation of a solid $K_2FeO_4$ pellet, containting 30% by weight of micro particulate graphite (2 $\mu$m powder) to improve conductivity. A hundred fold increase in current occurs, as observed in Table 3, in comparison of the planar electrocatalysts to the solid $K_2FeO_4/\mu$carbon electrode; with current densities of 10 $mA/cm^2$ and higher are sustained. The solid $K_2FeO_4$ pellet capacity and voltage are low without added graphite, and improves at lower current density, J. As shown in Table 3, the addition of up to 10% graphite, by weight, further improves both capacity and voltage of the redution of Fe(VI) cathode during discharge.

TABLE 3

Maximum steady state cathodic current density and polarization losses for Fe(VI) reduction at various electrodes and various solutions at 22° C. Fe(VI) refers to $K_2FeO_4$; C refers to graphite.

| Electrode | Solution | Polarization losses MV cm² mA⁻¹ | Maximum Current mA cm⁻² |
|---|---|---|---|
| Flat Ni | 2mM Fe(VI) 13.5 M KOH | 700 | 0.07 |
| Flat Pt | 2mM Fe(VI) 13.5 M KOH | 500 | 0.05 |
| Porous Ni 60 pores/inch | 2mM Fe(VI) 13.5M KOH | 150 | 0.4 |
| 100% Fe(VI) in 50 mg disc | 13.5 M KOH | 120 | 0.5 |
| 95% Fe(VI), 5% C in 50 mg disc | 13.5 M KOH | 60 | 2 |
| 90% Fe(VI), 10% C in 50 mg disc | 13.5 M KOH | 30 | 5 |
| 70% Fe(VI), 30% C in 50 mg disc | 13.5 M KOH | 20 | 10 |
| 70% Fe(VI), 30% C in 50 mg disc | 10 M KOH | 15 | 20 |

EXAMPLE 4

This example illustrates the, use of zinc metal anodes, and that during discharge with these anodes a high fraction of the electrical storage capacity of such super iron Fe(VI) salts as $K_2FeO_4$ (with 406 Ah/kg storage capacity, Table 1), and other salts listed in Table 1 such as $S_rFeO_4$, $Ag_2FeO_4$, $CaFeO_4$ and $BaFeO_4$, is achieved.

The super iron cathode may be combined with a zinc anode to form a super iron/zinc battery. In alkaline solutions, the oxidation of zinc is:

$$Zn+2OH^- \rightarrow ZnO+H_2O+2e^- \qquad (6)$$

Combined with equation 2, this describes a discharge of the super iron-zinc battery, as follows:

$$2FeO_4^{2-}+3Zn+3H_2O \rightarrow 3ZnO+2FeOOH+4OH^- \qquad (7)$$

The super iron-zinc batteries, for example as based on the Fe(VI) salt $K_2FeO_4$, have a theoretical specific energy higher than conventional aqueous (alkaline, metal hydride, lead or Ni/Cd) batteries, of:

$$1.8\ Volt \times 271\ Ah/kg=490\ Wh/kg. \qquad (8)$$

Figure 4:
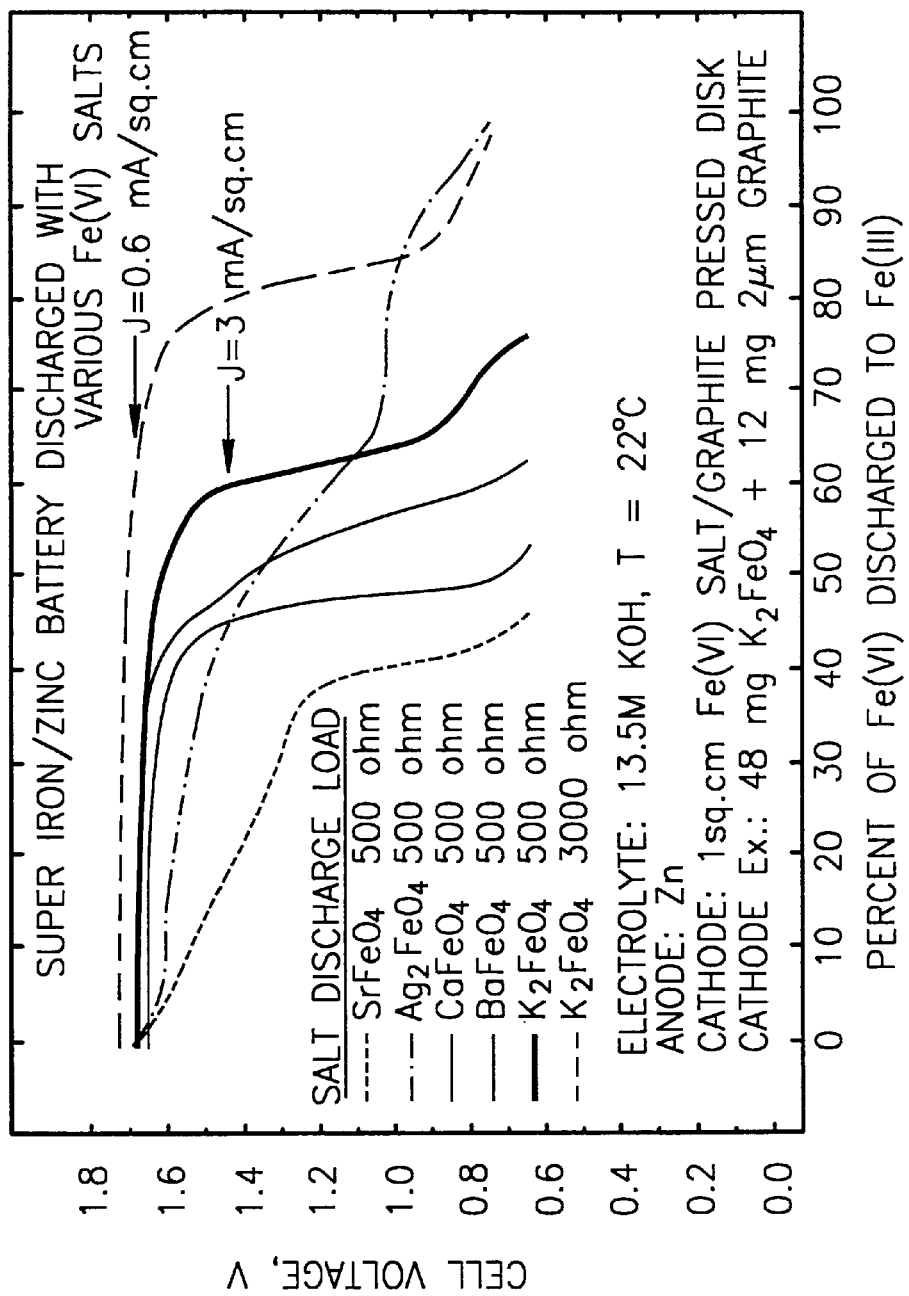

Super iron/zinc batteries, consisting of planar zinc and solid K2FeO$_4$ salt/$\mu$carbon electrodes separated by 10 or 13.5 M KOH were discharged at 22° C. The battery had a measured open circuit voltage of 1.7 to 1.8 V. Excess zinc was utilized to produce a $FeO_4^{2-}$ limited capacity cell, and determine the coulombic efficiency of the three electron reduction, eq 2. This efficiency is experimentally determined by comparing the coulombs generated during discharge to the theoretical faradaic equivalents available in the mass of $K_2FeO_4$, SrFeO, $Ag_2FeO_4$, $CaFeO_4$ or $BaFeO_4$, As seen in FIG. 4, at low current density discharge of 0.6 $mA/cm^2$, over 85% of the theoretical 3 $e^-$ per $FeO_4^{2-}$ is attained. Over 65% efficiency is measured at 3.5 $mA/cm^2$. Similar discharges are measured when the electrodes are separated by 10M KOH. Cells also discharge well with small volumes of aqueous solution. As illustrated in FIG. 4, the $Ag_2FeO_4$/Zinc battery exhibits a second lower voltage plateau leading to extended discharge behavior. Without being bound to any theory, this is related to the discharge of both Fe(VI) and Ag(I) according to:

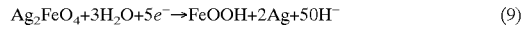

$$Ag_2FeO_4+3H_2O+5e^- \rightarrow FeOOH+2Ag+5OH^- \qquad (9)$$

A measured comparison of a super iron/zinc battery compared to a conventional alkaline battery is illustrated in FIG. 5. Hence, a conventional alkaline button configuration cell was discharged under a constant 3000 ohm load, and the specific energy determined as the cell potential multiplied by the current over time and divided by the mass. The 0.399 g mass of the cell was composed of 0.139 g Zn, electrolyte and separator, as well as 0.260 g of $MnO_2$ containing cathode. In the super iron/zinc battery a second conventional cell is opened and the $MnO_2$ containing cathode is replaced by 0.180 g of Fe(VI) cathode comprised by mass of 90% $K_2FeO_4$ and 10% graphite. As illustrated in FIG. 5, under the same 3000 ohm discharge charge load, the super iron cell delivers a storage capacity of approximately 250 W/kg, over a 160% increase compared to that in the conventional alkaline battery.

EXAMPLE 5

This example illustrates the use of cadmium metal anodes, with the Fe(VI) half-cell cathode and rechargeability of a super iron battery. Super iron/cadmium batteries, consisting of planar cadmium and solid $K_2FeO_4/\mu$carbon electrodes separated by 13.5 M KOH were discharged at 22° C. The battery had a measured open circuit voltage of 1.3 V, and the discharge at constant current is used to measure the storage capacity where the current, i, multiplied by the time and divided by the mass of the $K_2FeO_4$, provides the measured $K_2FeO_4$ storage capacity=i t/mass $K_2FeO_4$. As seen in Table 4, at low current density discharge of 0.4 mA/cm, a high storage capacity of 390 Amp hour/kg is attained. A 219 Amp hour/kg storage capacity is measured at 4 $mA/cm^2$. Table 4 includes repeated 1 $mA/cm^2$ discharge of super iron/cadmium batteries during three charge/discharge cycles. Partial reduction of Fe(VI) salts may cause, in addition to Fe(III) salts, formation of Fe(V) and Fe(IV) salts. Albeit at a lower capacity than the Fe(VI) half cell battery, these Fe(V) and Fe(IV) salts can be used as super iron half cells to also provide a high capacity super iron battery.

TABLE 4

Discharge and charge/discharge of a cell containing a 1 cm² 50 mg
$K_2FeO_4$ (as 70%, 30% 2 μm graphite) cathode and a cadmium
anode in 135 M KOH at 22° C. Each cycle 1 is prior to any recharge.
Cycles 2 and 3 are subseguent to 5 mA/cm² recharge

| Cycle 1 | Discharge Current | Measured $K_2FeO_4$ Storage Capacity |
|---------|-------------------|--------------------------------------|
| 1 | 0.4 mA | 390 Amp hour/kg |
| 1 | 1.0 mA | 329 Amp hour/kg |
| 1 | 1.0 mA | 329 Amp hour/kg |
| 2 | 1.0 mA | 207 Amp hour/kg |
| 3 | 1.0 mA | 195 Amp hour/kg |
| 1 | 4.0 mA | 219 Amp hour/kg |

I claim:

1. A storage battery, comprising two half-cells which are in electrochemical contact with one another through an electrically neutral ionic conductor, wherein one of said half-cells comprises an anode and the other half-cell comprises a cathode in form of a solid-phase Fe(VI) salt in an amount of at least 1% of the half-cell weight, whereby electrical discharge of charge is accomplished via electrochemical charge insertion to or from a valence of iron salt less than Fe(VI).

2. The battery according to claim 1, wherein said Fe(VI) salt includes a cation, selected from the group consisting of the alkali metal cations, ammonium H⁻ alkali earth metal cations, transition metal cations, and cations of groups III, IV and V of the periodic table.

3. The battery according to claim 1, wherein said anode includes a metal capable of being oxidized.

4. The battery according to claim 3, wherein said metal is selected from the group consisting of zinc, lithium, magnesium, calcium, aluminium, cadmium, lead, iron, copper, cobalt, nickel, chromium, titanium, gallium, iridium, manganese, silver, cadmium, barium tungsten, molybdenum, sodium, potassium, rubidium and cesium.

5. The battery according to claim 1, wherein said anode includes hydrogen capable of being oxidized.

6. The battery according to claim 1, wherein said anode includes an inorganic salt capable of being oxidized.

7. The battery according to claim 1, wherein said anode includes an organic compound capable of being oxidized, selected from the group consisting of aromatic and non-aromatic compounds.

8. The battery according to claim 1, wherein said electrically neutral ionic conductor is an aqueous solution.

9. The battery according to claim 1, wherein said electrically neutral ionic conductor is a non-aqueous solution.

10. The battery according to claim 1, wherein said electrically neutral ionic conductor is a conductive polymer.

11. The battery according to claim 1, wherein said electrically neutral ionic conductor is a molten salt.

12. The battery according to claim 1, wherein said electrically neutral ionic conductor is a solid ionic conductor.

13. The battery according to claim 8, wherein said solution contains hydroxide ions.

14. The battery according to claim 8, wherein said solution contains dissolved Fe(VI) salt.

15. The battery according to claim 1, further characterized in that said Fe(VI) salt is in contact with a conductive material.

16. The battery according to claim 15, wherein said conductive material is selected from the group of graphite, carbon black and metals.

17. The battery according to claim 15, wherein conductive material comprises a mixed pressed powder.

18. The battery according to claim 15, wherein said conductive material comprises a planar surface or a wire.

19. The battery according to claim 15, wherein said conductive material comprises a porous substrate or grid.

20. The battery according to claim 1 further comprising means to impede transfer of chemically reactive species between said two half-cells.

21. The battery according to claim 20, wherein said means is a non conductive separator configured with open channels, grids or pores.

22. The battery according to claim 1, wherein said electrically neutral ionic conductor contains a further solid solute or dissolved liquid for improving the stability of Fe(VI) and effectiveness of cell discharge.

23. The battery according to claim 22, wherein said further solid solute is selected from KOH and CsOH.

24. The battery according to claim 22, wherein said further solid solute is selected from LiOH and NaOH.

25. The battery according to claim 22, wherein said further dissolved liquid is an aqueous solution.

26. The battery of claim 20 in which said means to impede chemically reactive ion transfer comprises a membrane positioned to separate said half cells.

27. The battery according to claim 22, wherein said further dissolved liquid is a non-aqueous solution.

28. The battery according to claim 1, wherein said cell is rechargeable by application of a voltage in excess of the discharge cell open circuit potential.

29. The battery of claim 8, wherein said solution contains the concentration of tip to 5 molar hydroxide ions.

30. The battery of claim 8, wherein said solution contains the concentration from 5 to 10 molar hydroxide ions.

31. The battery of claim 8, wherein said solution contains the concentration from 10 molar to a solution saturated in hydroxide ions.

32. The battery according to claim 13, wherein the concentration of said Fe(VI) salt is at least 0.0001 molar.

33. The battery of claim 8, wherein the concentration of said Fe(VI) salt is above 0.0001 molar.

34. The battery of claim 8, wherein the concentration of said Fe(VI) ions is above 0.01 molar.

35. The battery of claim 8, wherein the concentration of said Fe(VI) ions is at or above 1 molar.

36. The battery according to claim 1 including a gas separator means for preventing the build-up of oxygen, hydrogen.

* * * * *